(12) United States Patent
Ferenc et al.

(10) Patent No.: US 11,034,264 B2
(45) Date of Patent: Jun. 15, 2021

(54) SEAT TRAVEL LIMITER

(71) Applicant: Brose Fahrzeugteile GmbH & Co. Kommanditgesellschaft, Coburg, Coburg (DE)

(72) Inventors: Anthony Ferenc, Goodrich, MI (US); Philip Bartko, Macomb, MI (US); Amy Daraban, Lincoln Park, MI (US); Collin Lockemy, Clinton Township, MI (US)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 80 days.

(21) Appl. No.: 16/532,222

(22) Filed: Aug. 5, 2019

(65) Prior Publication Data
US 2021/0039523 A1 Feb. 11, 2021

(51) Int. Cl.
*B60N 2/00* (2006.01)
*B60N 2/07* (2006.01)
*B60N 2/02* (2006.01)

(52) U.S. Cl.
CPC ......... *B60N 2/0727* (2013.01); *B60N 2/0224* (2013.01); *B60N 2/0715* (2013.01)

(58) Field of Classification Search
CPC . B60N 2/06; B60N 2/067; B60N 2/07; B60N 2/0702

USPC .......................... 248/424, 429, 430
See application file for complete search history.

(56) References Cited

U.S. PATENT DOCUMENTS

| 8,226,063 B2 * | 7/2012 | Weber ................. B60N 2/0705 |
| | | 248/429 |
| 10,144,310 B1 | 12/2018 | Ferenc et al. |
| 10,857,912 B2 * | 12/2020 | Rey ...................... B60N 2/0232 |
| 2004/0012236 A1 * | 1/2004 | Mallard ............... B60N 2/0232 |
| | | 297/344.1 |
| 2004/0206878 A1 * | 10/2004 | Borbe ..................... B60N 2/067 |
| | | 248/424 |
| 2006/0186687 A1 * | 8/2006 | Kimura ................ B60N 2/0232 |
| | | 296/65.13 |
| 2015/0336475 A1 * | 11/2015 | Hoffmann ................. B60N 2/06 |
| | | 297/344.1 |
| 2015/0360587 A1 * | 12/2015 | Hoffmann ............ B60N 2/0232 |
| | | 248/429 |
| 2019/0168638 A1 | 6/2019 | Geiges et al. |

* cited by examiner

*Primary Examiner* — Steven M Marsh
(74) *Attorney, Agent, or Firm* — Brooks Kushman, P.C.

(57) ABSTRACT

A rail assembly may include a translatable rail, a fixed rail, a gearbox assembly, and a nut. The fixed rail may include a spindle bracket that may define an aperture and the spindle may extend through the aperture. The gearbox assembly may be disposed on the spindle and configured to carry the translatable rail along the longitudinal direction and the fixed rail. The nut may be fixed to the gearbox assembly and include a first portion and a second portion that may be integrally formed with one another. A section of the first portion may be configured to be disposed in the aperture of the spindle bracket.

20 Claims, 6 Drawing Sheets

SEAT TRAVEL LIMITER

TECHNICAL FIELD

The present disclosure relates to a seat assembly, including a powered seat assembly for use in a vehicle.

BACKGROUND

Vehicle seats including front or first row vehicle seats may be adjusted e.g., translated with respect to a floor of the vehicle. Power vehicle seats, those adjusted by one or more motors, may include a translatable rail that translate along a spindle fixed to a stationary rail. A desired position of the seat may vary according to a passenger's preferred position. For example, those passengers with longer legs may require additional leg room than passengers with shorter legs, and as such may position their seat further away from an object e.g., dashboard or another seat in the vehicle.

The forward-most or rearward-most positions of the vehicle seat may vary between a driver seat and a passenger seat. In other words, the travel range of the driver seat may be less than or greater than a travel range of a passenger seat. This difference may be related to each seat's relative position to an airbag or other interior component. Generally, a driver seat and a passenger seat are, for the most part, structurally identical and absent additional components, provide the same amount of travel. As such, additional components are required to differentiate the travel range between the driver seat and passenger seat.

SUMMARY

According to one embodiment, a rail assembly, for use in a vehicle, configured to translate a cushion pan in a longitudinal direction is provided. The rail assembly may include a translatable rail, a fixed rail, a gearbox assembly, and a nut. The fixed rail may include a spindle bracket that may define an aperture or recess and the spindle may extend through the aperture or into the recess. The fixed rail or the translatable rail may define the aperture or recess. The gearbox assembly may be disposed on the spindle and configured to carry the translatable rail along the longitudinal direction and the fixed rail. The nut may be disposed on the spindle and include a first portion, a second portion, and a third portion. The first, second, and third portions may be integrally formed with each other. A portion of an outer periphery of the first portion is configured to be disposed in the aperture of the spindle bracket such that the spindle is radially movable, with respect to the longitudinal direction. A distal end formed by the third portion may be configured to stop the translatable rail at a predetermined position.

The third portion may be an elongated cylinder and may include a second aperture configured to receive the spindle. The second aperture may be a first counterbore extending from the first distal end to the second portion and configured to receive the spindle.

The second portion may include a second counterbore. An angle of the first counterbore and an angle of the second counterbore may be the same.

The first portion may include a plurality of crush ribs that may radially extend from and form a portion of the outer periphery.

The first portion may be formed of a first material that may have a first elasticity and the second portion may be formed of a second material that may have a second elasticity. The first elasticity may be greater than the second elasticity.

The first portion may include a second distal end that may define a lead-in chamfer.

The first portion may include a flange that may radially extend from an outer periphery of the first portion. The flange may be disposed on a first side of the spindle bracket and the gearbox assembly may be disposed on a second side of the spindle bracket, opposite the first side of the spindle bracket.

The second portion may include a sidewall radially extending from an outer periphery of the second portion. The flange and the sidewall may be configured to sandwich the spindle bracket.

According to another embodiment, a rail assembly, for use in a vehicle, configured to translate a cushion pan in a longitudinal direction is provided. The rail assembly may include a translatable rail, a fixed rail, a gearbox assembly, and a nut. The fixed rail may include a spindle bracket that may define an aperture. The fixed rail or the translatable rail may define the aperture or recess. The spindle may extend at least partially into the aperture or recess. The gearbox assembly may be disposed on the spindle and configured to carry the translatable rail along the longitudinal direction and the fixed rail. The nut may be fixed to the gearbox assembly and include a first portion and a second portion that may be integrally formed with one another. A section of the first portion may be configured to be disposed in the aperture of the spindle bracket.

The gearbox assembly may include a gearbox and a gearbox bracket that may be each configured to translate along the spindle. The second portion may include a sidewall that may be connected to the gearbox bracket.

The second portion of the nut may include a first projection that may at least partially extend through a vertical wall of the gearbox bracket.

The second portion may include a flange extending from the sidewall. The gearbox bracket may include a horizontal wall orthogonally extending from the vertical wall of the gearbox assembly, and the flange may be fixed to the horizontal wall.

In one or more embodiments, the second portion may be at least partially overmolded to the gearbox assembly.

According to yet another embodiment, a vehicle seat assembly is provided. The vehicle seat assembly may include a cushion pan, a first track assembly, and a second track assembly, each coupled to the cushion pan. The first track assembly may include a translatable rail, a first fixed rail, a first spindle, a first gearbox, and a first nut. The first fixed rail may include a first spindle bracket that may define a first aperture. The first gearbox may be coupled to the first translatable rail and configured to translate along the spindle to translate the first translatable rail in the longitudinal direction. The first nut may be disposed on the first spindle and may include a first portion and a second portion that may be integrally formed with one another. An outer periphery of the first portion may be insertable within the first aperture.

The second track assembly may include a translatable rail, a second fixed rail, a second spindle, a second gearbox, and a second nut. The second fixed rail may include a second spindle bracket that may define a second aperture. The second gearbox may be coupled to the second translatable rail and configured to translate along the spindle to translate the second translatable rail in the longitudinal direction. The second nut may be disposed on the second spindle and may include a third portion and a fourth portion that may be integrally formed with one another. An outer periphery of the third portion may be insertable within the second aperture. The second portion and the fourth portion may each be configured to stop the first and second translatable rails at a predetermined position.

The first nut may have a first length and the second nut may have a second length, different than the first length. In one or more embodiments, the second length may be greater than the first length.

The first spindle may include a front portion and a rear portion, each disposed on opposite sides of the first gearbox. The first track assembly may include a spacer that may have a third length and may be disposed on the rear portion of the first spindle. A difference between the first length and the second length may correspond to the third length of the spacer.

The first nut may include a first plurality of internal threads and the second nut may include a second plurality of internal threads. The first plurality of internal threads may be arranged in a first direction and the second plurality of threads may be arranged in a second direction, that may be opposite the first direction.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The term "lead-chamfer" may refer to a chamfer formed on an end of a shaft or fastener that is configured to facilitate insertion of the shaft or fastener through an aperture or opening.

The term "elongated" may be used herein to describe disclosed or claimed embodiments. The term "elongated" means a component having a length that is longer than the width of the component.

The term "bond" may be used herein to refer to a mechanical connection, or chemical connection, or both, that may be formed by an over-molding process. A mechanical bond may refer to a force fit or interference fit connection between first component and a second component. One or more surfaces of one component and one or more surfaces of the other component may include engagement or retention features that are configured to engage with one another.

The percentages of interfacing surfaces that contact each other is in the range of 50% to 100%. A chemical bond may refer to a molecular bond that may be formed by a multi-shot injection molding process.

An adjustment device for adjusting a vehicle seat, such as a rail assembly are known. As one example, U.S. Pat. No. 10,144,310 discloses an adjustment device for adjusting a longitudinal position of a vehicle seat including a first guide rail, a spindle extending along a longitudinal axis, a holding device connecting the spindle to the first guide rail, a second guide rail being linearly movable along the longitudinal axis with respect to the first guide rail, and a gearing fixed to the second guide rail, the gearing being in operative connection with the spindle to move the second guide rail relative to the first guide rail, and is hereby incorporated by reference in its entirety.

As mentioned above, the forward-most or rearward-most positions of the vehicle seat may vary between a driver seat and a passenger seat. Generally, the adjustment mechanisms of the driver and passenger seats are nearly identical. Using similar or common components between driver and passenger seats may provide economies of scale and reduce complexity and costs associated with manufacturing the seats. As such, additional components may be required to differentiate the travel between the driver seat or the passenger seat. The additional component may be a limit stop or stop device that may be installed on the spindle. While driver and passenger seats are specifically mentioned, they are merely used as examples and other seats e.g., second or third row seats may be contemplated by the present disclosure.

The adjustment mechanisms may include a pair or rail assemblies. The rail assemblies may include a translating rail, a fixed rail, and a spindle configured to carry the translating rail. The spindles of the adjustment mechanisms may be fixed such that the spindle does not move or translate along a longitudinal direction defined by the fixed rail. One or more fasteners such as a nut may be fixed to the spindle so that the spindle is fixed axially to the fixed rail.

To account for variations in tolerances and to prevent binding of the gearbox or of the translating rail within the fixed rail, the spindle may float or move radially. Moreover, to prevent transmission of vibrations, noise, or some combination thereof from the spindle to the fixed rail and to the occupant, a sound dampening component may be disposed between the spindle the fixed rail.

As one example, a bushing may be disposed between the spindle and the fixed rail. The bushing may be made from a polymeric material that is configured to allow the spindle to move radially. Moreover, the bushing may be relatively soft or pliable to deaden vibrations transmitted from the spindle as the gearbox translates along the spindle.

The present disclosure provides one or more alternatives that may eliminate the need for the axial nut, bushing, and the limit stop.

Referring generally to the figures, a rail assembly 100 configured to translate a cushion pan 102 in a longitudinal direction D1 is provided. The rail assembly 100 may include a translatable rail 104, a fixed rail 106, and a spindle 108. The fixed rail 106 may include a spindle bracket 110 that may be fixed to the fixed rail 106 and that may define an aperture 111. The spindle 108 may extend through the aperture 111. A gearbox assembly 112 may be disposed on the spindle 108 and may be configured to carry the translatable rail 104 in the longitudinal direction D1. The rail assembly 100 may include a nut 114 that may be disposed on the spindle 108.

The nut 114 may include a first portion 116 and a second portion 118 that may extend from and be integrally formed with the first portion 116. In one or more embodiments, the first portion 116 may be bonded to the second portion 118. An outer periphery of the first portion 116, or at least a portion of the outer periphery may be disposed in the aperture 111 of the spindle bracket 110. The first portion 116 may be arranged in the aperture 111 so that the spindle 108 may move radially. Allowing the spindle 108 to move radially may account for tolerances of various components and may prevent the gearbox, translatable rail, or both from binding as the gearbox assembly 112 and translatable rail 104 translates. In one or more embodiments, the first portion 116 may include a number of ribs such as crush ribs 126. The crush ribs 126 may be configured to deform to allow the nut 114 and the spindle 108 to move radially. One or more of the crush ribs 126 may include notches 128 that may be configured to engage a portion of the spindle bracket 110, such as an inner periphery of the aperture 111 in the spindle bracket 110.

In one or more embodiments, portions of the nut may be formed of different materials. As one example, the first portion 116 may be formed of a material that has a greater elasticity or a softer material than the second portion 118. The first portion may be formed of a thermoplastic elastomer such as DuPont™ Hytrel® TPC-ET with a tensile stress at 10% strain that may range between 1.4 MPa and 2.4 MPa or a tensile modulus that ranges between 14 MPa and 34 MPa. The second portion may be formed of a Polyamide, such as PA66 or Nylon 66 with a tensile strength that ranges between 60 MPa and 85 MPa.

The first portion 116, the second portion 118, and third portion 120 may be integrally formed with one another. If the material of the one of the portions 116, 118, 120 is different than that of the other portions 116, 118, 120, each of the portions 116, 118, 120 may be integrally formed to one another by a multi-shot injection molding process. Alternatively, one or more of the portions 116, 118, 120 may be formed by additive manufacturing, such as three-dimensional printing or another suitable process.

If the material of the one of the portions 116, 118, 120 are same, each of the portions 116, 118, 120 may be formed by a molding process, such as injection molding. Alternatively, a casting or cold-heading process may be used to form one or more of the portions 116, 118, 120. As another example, one or more of the portions 116, 118, 120 may be mechanically fixed to one another. For example, the one or more of the portions 116, 118, 120 may be fixed to one another by a force-fit or interference fit. Alternatively, one or more of the portions 116, 118, 120 may include threads that engage threads of the other portions 116, 118, 120.

The second portion 118 may include internal threads 141 that may be configured to engage threads of the spindle 108. For the purposes of clarity, the threads of the spindle 108 are not shown.

The nut 114 may include a third portion 120 that may extend from the second portion 118 to a first distal end 122. The third portion 120 may be an elongated cylinder and the distal end 122 may be configured to stop the translatable rail 104 at a predetermined position. As one example, the gearbox assembly 112 may be configured to engage the first distal end 122 of the nut. The third portion 120 may include an aperture such as a counterbore 124 that may be configured to receive the spindle 108.

Figure 4:
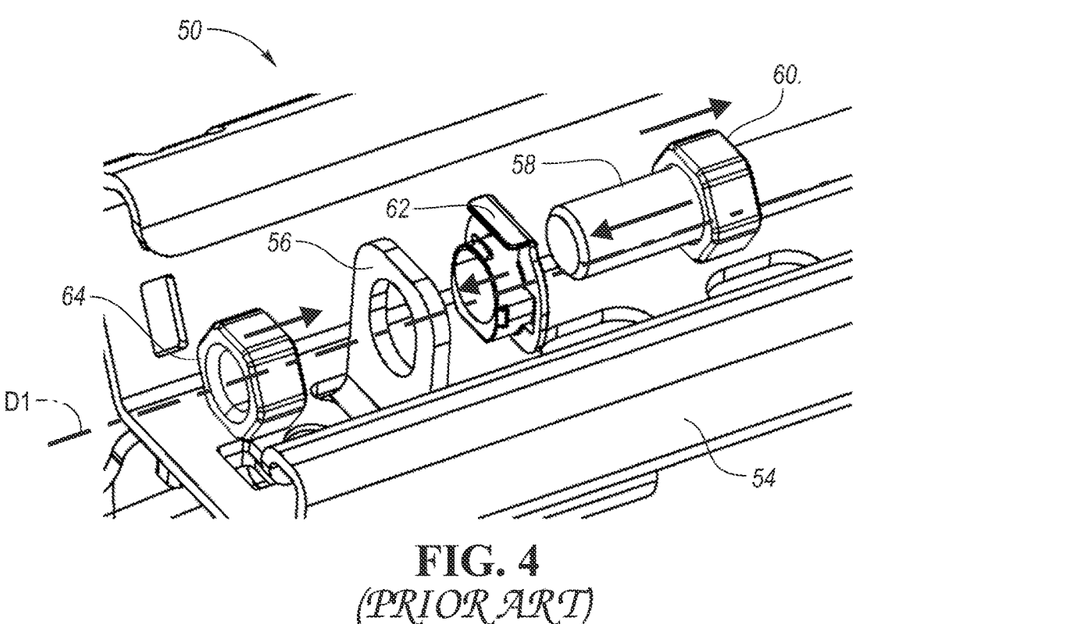
FIG. 4 is a partial-exploded view of a prior-art rail assembly.
Figure 5:
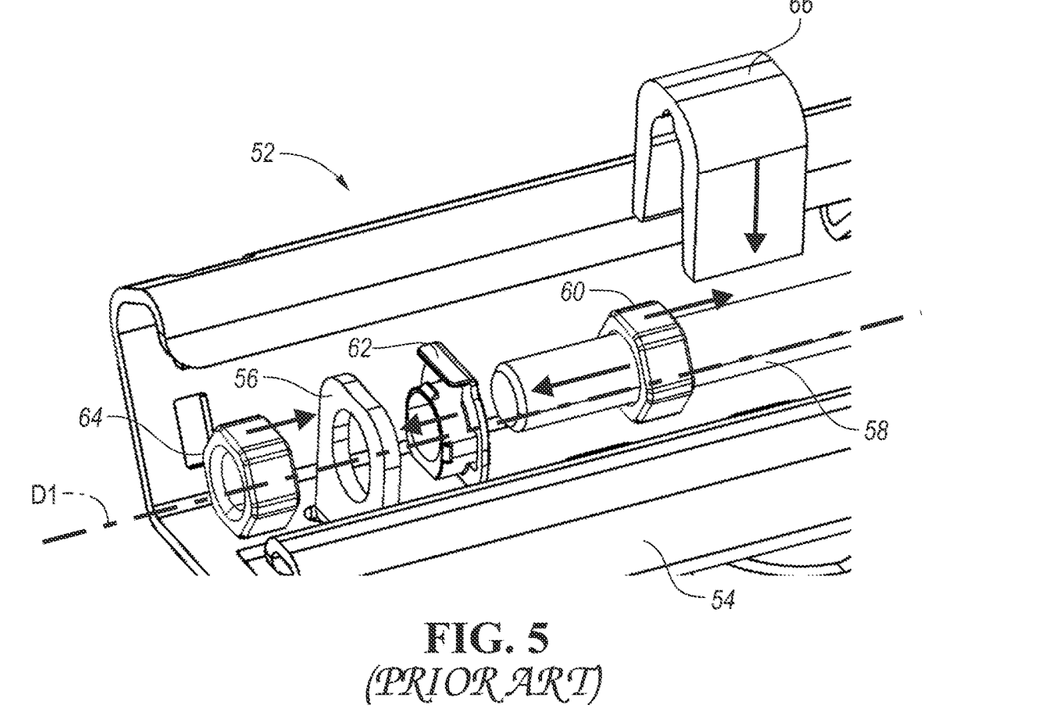
FIG. 5 is a partial-exploded view of a prior-art rail assembly including a travel limiter.

FIG. 4 and FIG. 5 each illustrate examples of prior art rail assemblies 50, 52. Each of the rail assemblies 50, 52 include a fixed rail 54 and a spindle bracket 56 coupled thereto. To assemble the spindle 58 to the fixed rail 54, a rear nut 60 is threaded to the spindle 58 towards a rear of the rail assembly 50, as indicated by the arrow next to the rear nut 60. A bushing 62 is inserted into the spindle bracket 56 towards the front of the rail assembly 50. The spindle 58 is then inserted through the bushing 62 and the front nut 64 is threaded to the spindle 58. The rear nut may be permanently deformed, e.g., crimped to secure the rear nut 60 to the spindle 58.

Referring specifically to FIG. 5, a limit stop 66 is used to differentiate the travel distance of the second rail assembly 52 from the first rail assembly 50. The limit stop 66 is U-shaped and is configured to engage the spindle in a force-fit or interference fit condition.

Figure 1:
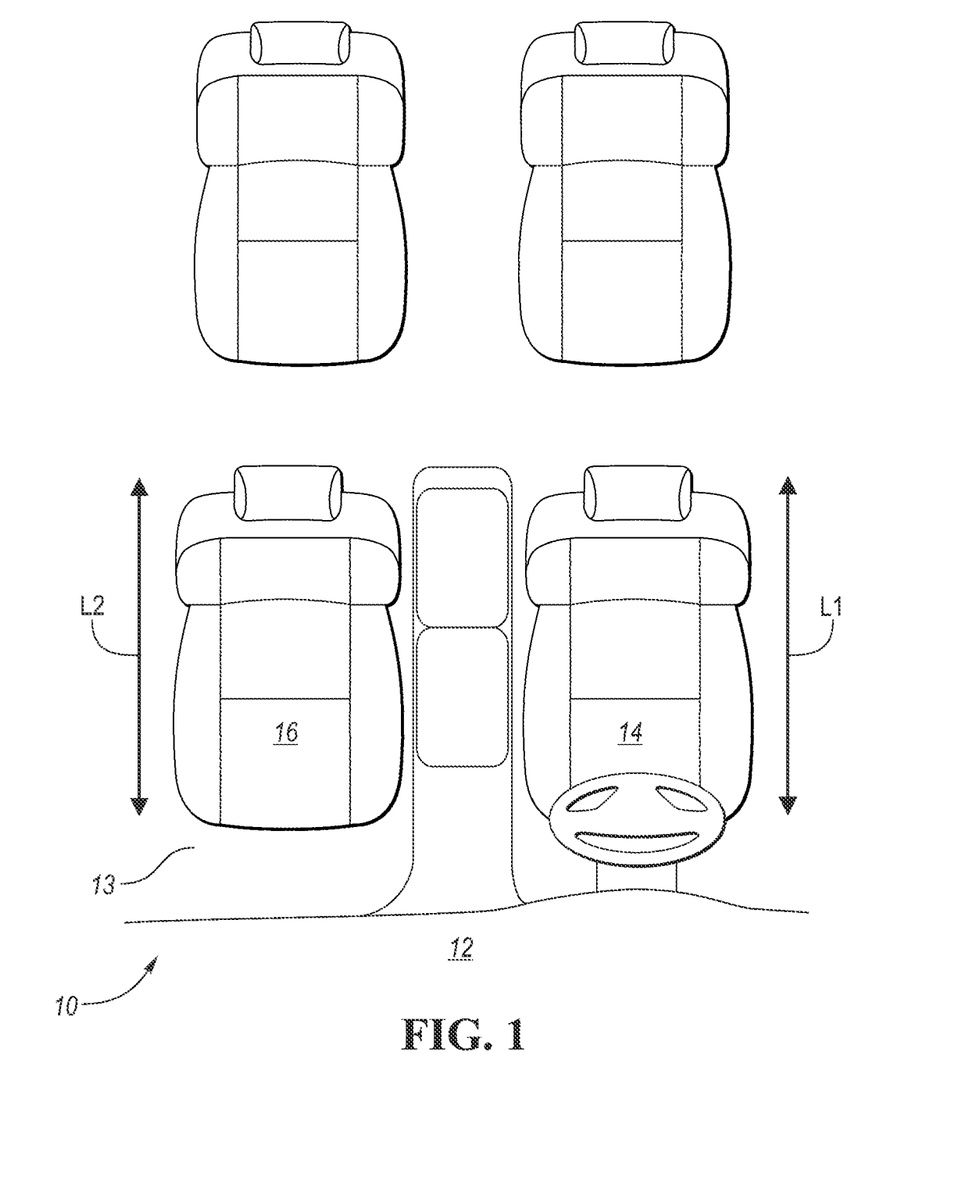
FIG. 1 is a top view of an interior portion of a vehicle cabin.

FIG. 1 illustrates a top view of a vehicle cabin 10. The vehicle cabin may include a dashboard 12, positioned towards a front of the vehicle, a first seat, such as a driver seat 14, and a second seat, such as a passenger seat 16. The driver seat 14 may have a first travel range, a distance traveled with respect to the floor of the vehicle, as indicated by the directional arrow L1 and the passenger seat 16 may have a second travel range L2. In one or more embodiments, the second travel range L2 may be greater than the first travel range L1 so that when each of the seats 14, 16 are in their forward-most positions, the driver seat 14 may be spaced further away from the dashboard 12 than the passenger seat 16. As another example, the travel ranges L1, L2 may be the same. And in yet another example, the second travel range L2 may be less than the first travel range L1. While driver and passenger seats are specifically mentioned, they are merely used as examples and other seats e.g., second or third row seats may be contemplated by the present disclosure.

Figure 2:
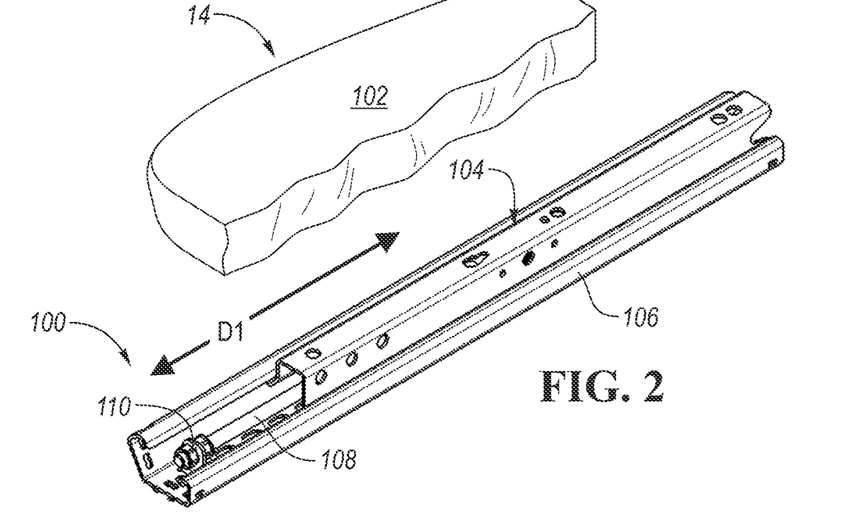
FIG. 2 is a schematic perspective view of an exemplary rail assembly and cushion pan.

FIG. 2 illustrates a schematic view of a portion of the seat assembly 14 including the rail assembly 100 and the cushion pan 102. For the purposes of simplicity and clarity, only one rail assembly 100 is illustrated. One of ordinary skill in the art understands that a second rail assembly is generally included in a seat assembly and is symmetrically opposite e.g., mirrored, to the first rail assembly 100. The cushion pan 102 is represented by an elongated polygonal shape. The cushion pan 102 may be coupled to the rail assembly 100 by one or more links and fasteners (not illustrated).

As mentioned above, the first rail assembly 100 includes the first translatable rail 104, the fixed rail 106, and the spindle 108. The fixed rail 106 may be coupled, directly or indirectly, to the vehicle floor 13 (FIG. 1) and the spindle bracket 110 may be coupled, directly or indirectly, to the fixed rail 106.

Figure 3A:
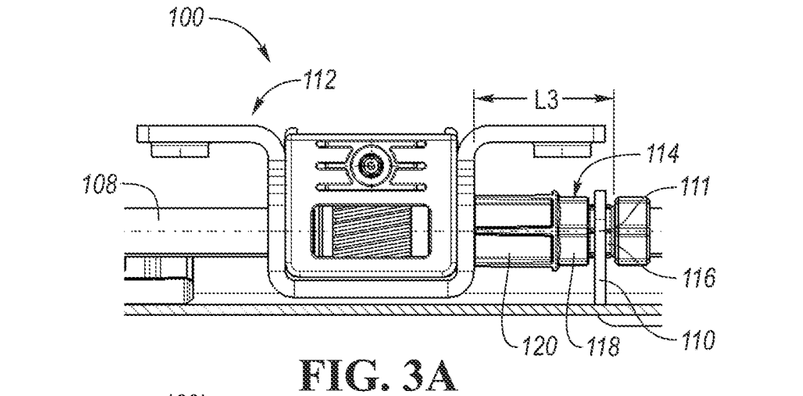
FIG. 3A is a partial-plan view of a first spindle and a gearbox assembly.
Figure 3B:
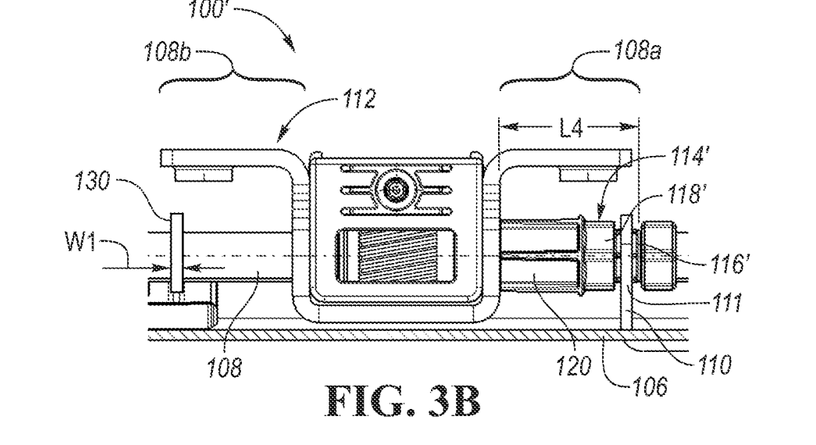
FIG. 3B is a partial-plan view of a first spindle and a gearbox assembly.

FIG. 3A illustrates a plan view of a portion of the first rail assembly 100 and FIG. 3B illustrates a plan view of a portion of a second rail assembly 100'. The components that are identical between the first and second rail assemblies 100, 100' will be described once in their singular form. The rail assembly 100 includes a gearbox assembly 112 that may be coupled to the translatable rail 104 such that actuation of a motor (not illustrated), coupled to the gearbox assembly 112, moves the gearbox assembly 112 along the spindle 108. In one or more embodiments, the motor may be coupled to the spindle 108 so that actuation of the motor rotates the spindle 108. A U-shaped bracket 113 may be fixed to the gearbox assembly 112 and be coupled to the translatable rail 104. As the gearbox assembly 112 moves along the spindle 108, the gearbox assembly carries the translatable rail 104 in the longitudinal direction D1.

The first rail assembly 100 may include a first nut 114 disposed on the spindle 108. The first nut 114 may include the first portion 116, the second portion 118, and third portion 120 that may be integrally formed with one another. An outer periphery of the first portion 116 may be insertable within an aperture defined by the spindle bracket 110. The second rail assembly 100' may include a second nut 114' disposed on the spindle 108. The second nut 114' may include a first portion 116', a second portion 118', and a third portion 120' that may be integrally formed with one another. An outer periphery of the first portion 116' may be insertable within an aperture defined by the spindle bracket 110. The third portions 120, 120' may each be configured to stop the translatable rails at a predetermined position.

In one or more embodiments, the first nut 114 and the second nut 114' may have different lengths. As one example, the first nut 114 may have a first length L3 and the second nut 114' may have a second length L4 that may be greater than the first length L3. The first spindle 108 may include a front portion 108a, disposed on one side of the first gearbox 112 and a rear portion 108b disposed on the other side of the first gearbox 108. A spacer 130 such as a washer may be disposed on the rear portion 108b of the spindle 108. The spacer may have a width W1 that may be configured to offset the relative position the first gearbox 112 with respect to the position of the second gearbox when each of the gearboxes 112, 112' are in a full rear position. Maintaining an offset between each of the gearboxes 112, 112' may facilitate moving each of the gearboxes 112, 112' when they are in either the full forward or the full rear positions. A difference between the first length L3 of the first nut 114 and the second length L4 of the second nut 114 may correspond to the width W1 of the spacer 130. While a pair of rail assemblies each including the nut are illustrated and discussed, in one or more embodiments only one of the rail assemblies may include the nut.

In one or more embodiments, the first spindle 108 may have a plurality of threads that are arranged in a first direction e.g., left-hand threads, and the second spindle 108' may have a plurality of threads that are arranged in a second direction, e.g., right-threads (or vice-versa). As such the first nut 114 may include a plurality of internal threads 141 that correspond to the threads of the first spindle 108 and the second nut 114' may include a plurality of threads that correspond to the threads of the second spindle 108'.

Figure 6:
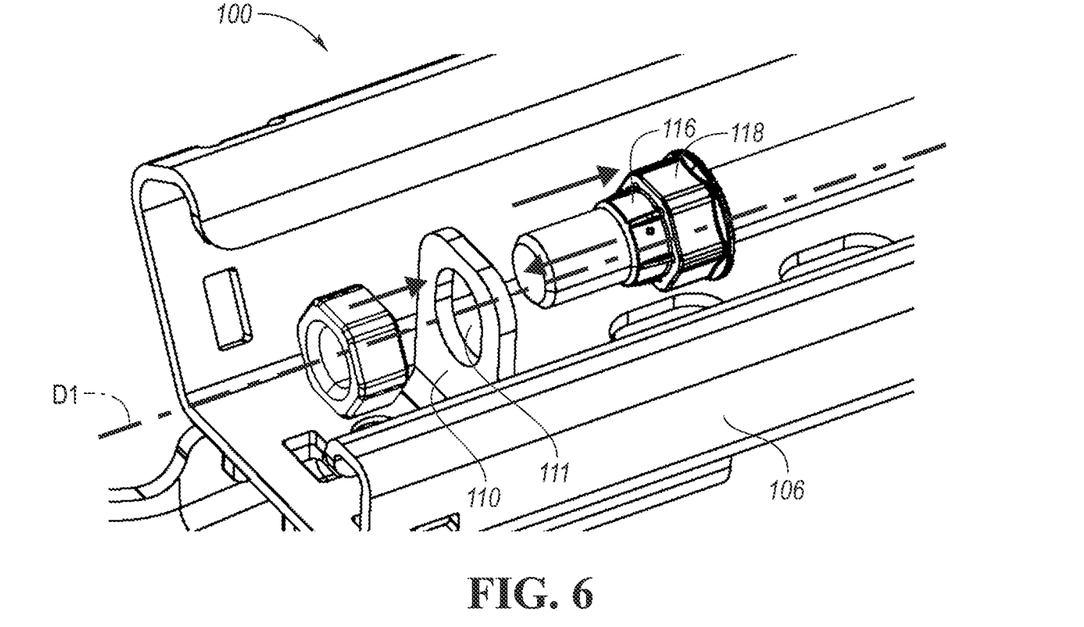
FIG. 6 is a partial-exploded view of an exemplary rail assembly.

FIG. 6 illustrates a partial-exploded view of a rail assembly 100 according to one or more embodiments. The rail assembly 100 may include the fixed rail 106 and the spindle bracket 110 attached thereto. The first nut 114 may engage the spindle 108 and include a first portion 116 and a second portion 118. The first portion 116 may be configured to be inserted within the aperture 111 of the spindle bracket 110. A front engagement member, such as a front nut 64, may be threaded to the spindle 108 to retain the spindle to the spindle bracket 110.

Figure 7:
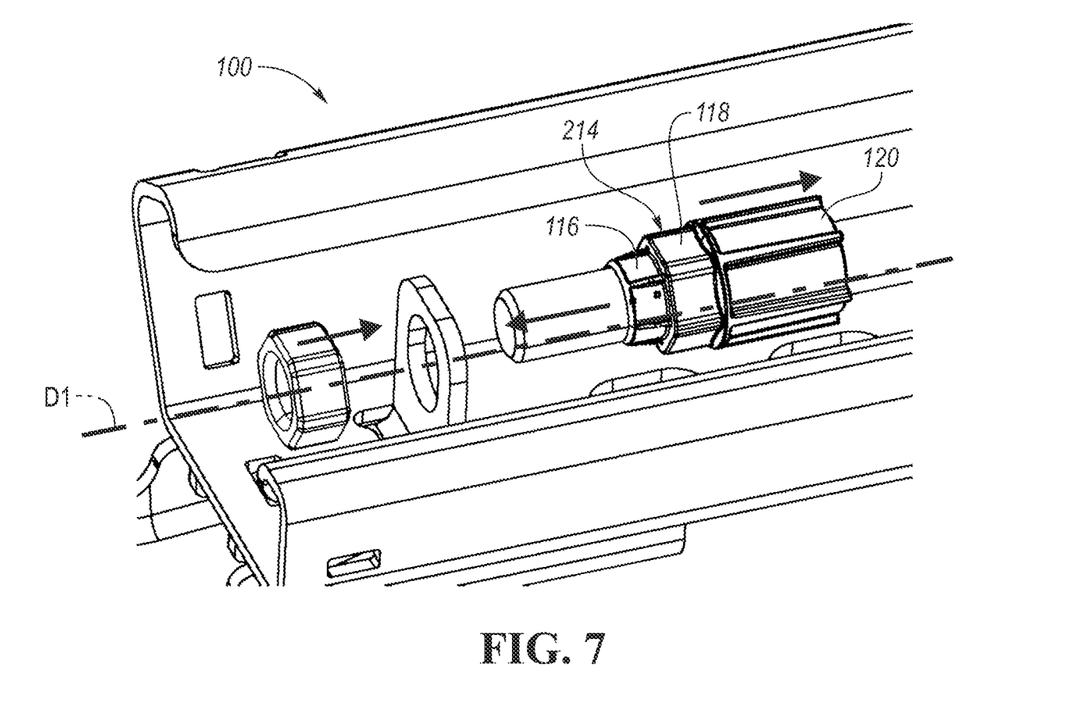
FIG. 7 is a partial-exploded view of another exemplary rail assembly including a travel limiter.

FIG. 7 illustrates a partial-exploded view of a rail assembly 100 including first nut 214 according to one or more embodiments. The first nut 214 may include a first portion 116, a second portion 118 and the third portion 120. The third portion 120 may be an elongated cylinder that may act as a limit stop to alter a travel of the rail assembly 100. Incorporating the third portion 120 into the first nut 214 may eliminate the limit stop 66 (FIG. 5) and the assembly process of the Moreover, the elongated cylinder of the third portion 120 may provide a more robust design in terms of retaining the limit stop to the spindle 108, or in a desired position along the spindle, or both, as compared to the U-shaped limit stop 66.

Figure 8:
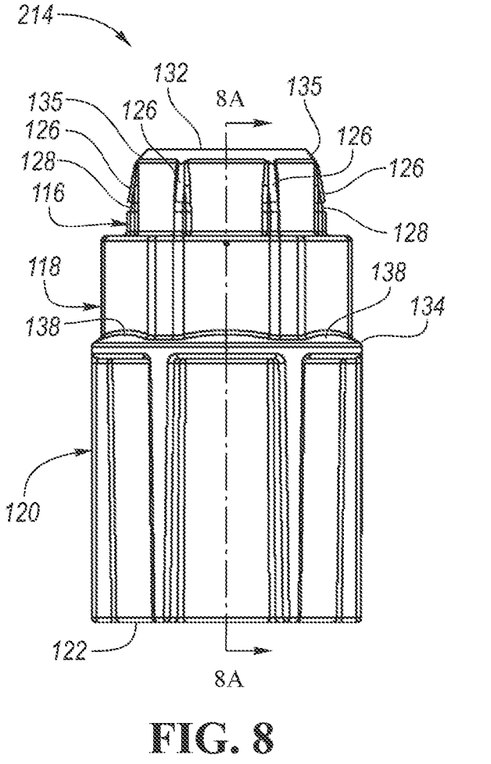
FIG. 8 is a top view of an exemplary nut.

FIG. 8 illustrates a plan view of the first nut 214 according to one or more embodiments. As mentioned, the first nut 214 may include a first portion 116, a second portion 118, and a third portion 120. A number of crush ribs 126 may extend from and form an outer periphery of the first portion 116. One or more of the crush ribs 126 may include one or more notches 128 or recessed portions that may be configured to engage portions of the spindle bracket 110. A number of the crush ribs may be tapered between the notch 128 and a second distal end 132. The first nut 214 may include the first distal end 122, configured to act as a stop for the gearbox 112, and the second distal end 132 that may be configured to be inserted within the aperture 111 of the spindle bracket 110. As one example, the second distal end 132 may be chamfered to form a lead-in chamfer 135 that may facilitate inserting the first portion 116 into the aperture 111.

The first portion 116 may have a first outer diameter D2, the second portion 118 may have a second outer diameter D3, that may be greater than the first outer diameter D2, and the third portion 120 may have a third outer diameter D4, that may be greater than the second outer diameter D3. An outer periphery of the second portion 118 may include a number of sidewalls that may be engaged by a tool, such as socket, for fastening the first nut 214 to the spindle 108. As one example, the outer periphery of the second portion 118 may have a hexagonal shape.

The second portion 118 and the third portion 120 may be connected by a mating wall 134. The mating wall 134 may form a flange 136 extending from the second portion 118 to the third portion 120. The flange 136 may include a number of protrusions 138 that extend in an axial direction with respect to the third portion 120. The protrusions 138 may differentiate the first nut 214, illustrated in FIGS. 7 and 8, from the first nut 114 illustrated in FIG. 6. For example, if the first nut 114 is oriented incorrectly e.g., backwards, the protrusions 138 may prevent the tool from engaging the second portion 118. As another example, during installation of the nut, a tool may move towards the nut to engage the second portion. The protrusions may hit or engage the tool so that it may be stopped and prevented from further movement. A distance moved by the tool may be measured and compared to a predetermined value so that the orientation of the nut is confirmed. For example, if nut is placed on the spindle 108 incorrectly e.g., backwards, the tool may move and engage the third portion 120. The distance to move the tool to engage the third portion 120, is greater than the distance to move the tool to engage the second portion 118.

Figure 8A:
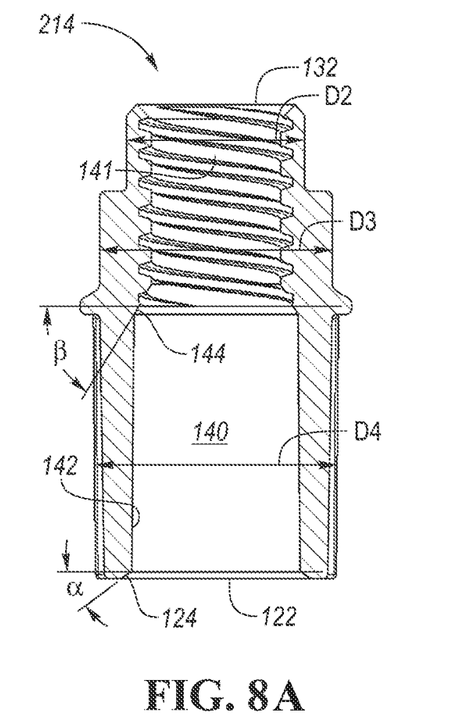
FIG. 8A is a cross-sectional view taken along the lines A-A in FIG. 6.

FIG. 8A illustrates a cross-sectional view of the nut 214 taken along the lines A-A in FIG. 8. Internal threads 141 may extend from the second distal end 132 through the first portion 116 and the second portion 118 to the third portion 120. The third portion may define an aperture, such as a through opening 140 that may extend from the first distal end 122 to the second portion 118. The through opening 140 may include an inner periphery formed by a sidewall 142. As one example, the through opening 140 may be tapered, or wider near the first distal end 122 and narrower towards the second portion 118 of the nut 214. The through opening 140 may have the counterbore 124 at the first distal end 122. The through opening 140 may terminate at a second counterbore 144 formed by the second portion. The first counterbore 124 may form an angle $\alpha$ with respect to a transverse axis 146 and the second counterbore 144 may form an angle $\beta$, with respect to the transverse axis 146. The first angle $\alpha$ may be substantially equal to the second angle $\beta$.

A distal end of the first nut 114, illustrated in FIG. 6, may include the through opening 140 and the second counterbore 144, as described above. Because the through opening 140 and the second counterbore 144 of the nut 114 and the nut 214, similar manufacturing parameters may be used to when installing each of the nuts 114, 214.

Figure 9:
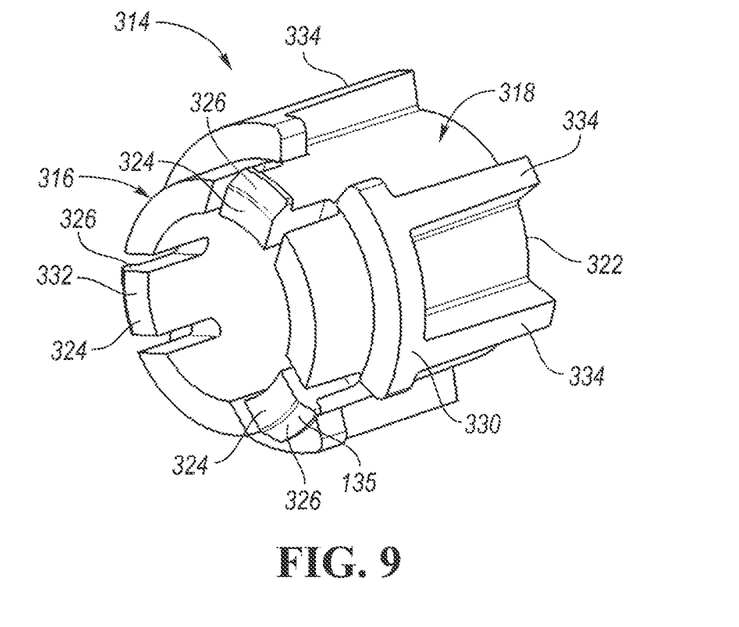
FIG. 9 is a perspective view of an exemplary nut.

FIG. 9 illustrates a perspective view of an exemplary nut 314 according one or more embodiments. The nut 314 may include a first portion 316 and a second portion 318 that may be integrally formed with one another. The second portion 318 may include a first distal end 322 and the first portion may include a second distal end 332. The second portion 318 may define an aperture that may include a plurality of internal threads (not illustrated) that may be configured to engage threads of the spindle 108. The first portion 316 may include a number of fingers 324 that may be configured to bend or deform radially. One or more of the fingers 324 may include a retention tab 326 that may extend radially from the fingers. The retention tab 326 may include a lead-in chamfer 135 that may be configured to facilitate insertion of the first portion 316 through the aperture 111 of the spindle bracket 110.

The second portion 318 may include a sidewall 330 that may extend radially from and form a portion of the outer periphery of the second portion 318. When the first portion 316 is inserted within the aperture 111, the retention tab 326 and the sidewall 330 may sandwich the spindle bracket 110. The second portion 318 may include a number of ribs 334 that may extend radially from and form portions of the outer periphery of the second portion 318. The ribs 334 may provide additional strength and cross-sectional areas compared to a second portion 318 without the ribs 334.

Figure 10:
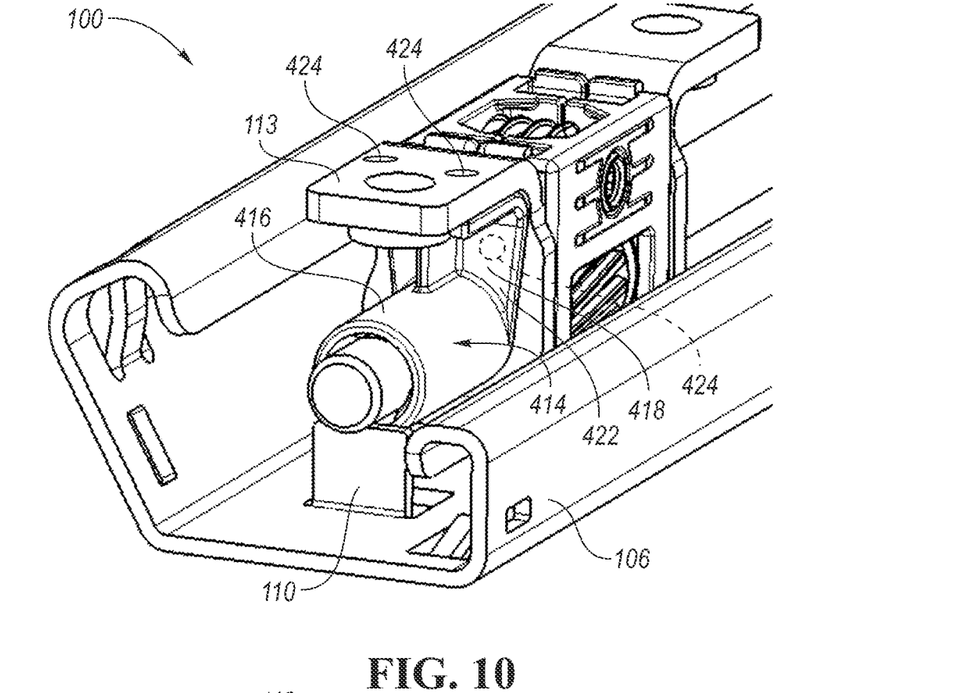
FIG. 10 is a perspective view of an exemplary gearbox assembly and an exemplary nut.
Figure 11:
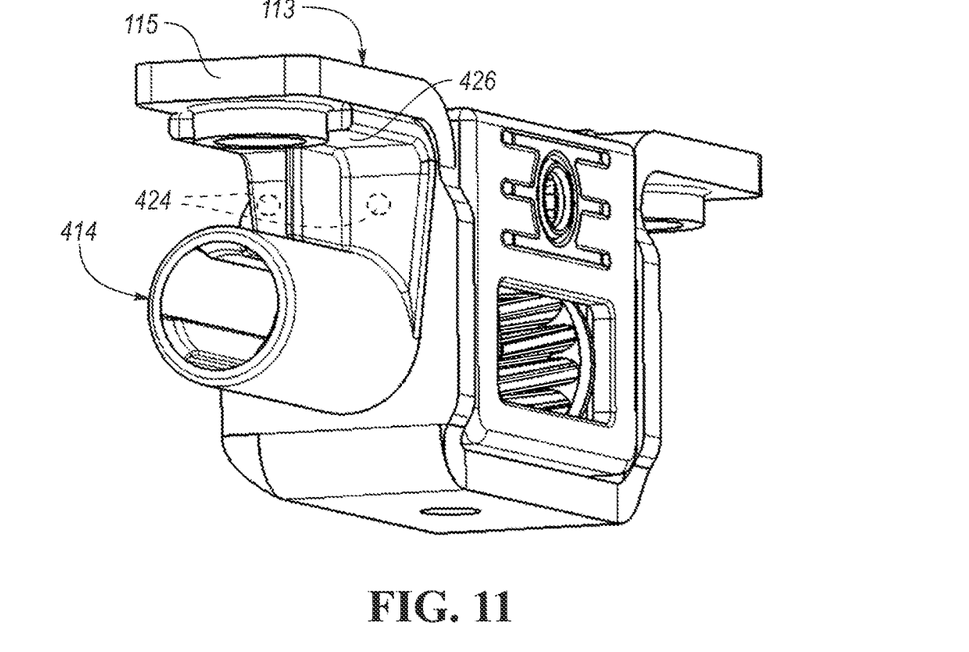
FIG. 11 is a perspective view of an exemplary gearbox assembly and an exemplary nut.

FIG. 10 illustrates a partial-perspective view of a rail assembly 100 and a nut 414 according to one or more embodiments. FIG. 11 illustrates a partial-perspective view of a gearbox assembly 412 and the nut 414. The nut 414 may include a first portion 416, that may engage a spindle bracket 410 fixed to the fixed rail 106, and a second portion 418 that may be fixed to the U-shaped bracket 113. The second portion 418 may include a sidewall 422 that may extend radially from the first portion 416. The sidewall 422 may include one or more projections 424 that may extend in an axial direction through attachment apertures defined by the U-shaped bracket 113. As another example, the first portion 416 may extend through another aperture defined by the U-shaped bracket. One or more of the projections 424 that extend through the U-shaped bracket 113 may include a flange (not illustrated) that may engage portions of the U-shaped bracket 113.

In one or more embodiments, the spindle bracket 410 may not define an aperture. Rather the spindle bracket may define a recess that may engage a portion of the spindle 108. As another example, the either the fixed rail 106 or the translatable rail 104 may define the aperture 111 or the recess that the spindle 108 engages.

A flange 426 may extend axially from the sidewall 422 and be configured to attach to an axially extending portion 115 of the U-shaped bracket. The flange 426 may include one or more projections 424 that may extend through the axially extending portion 115 of the U-shaped bracket 113. In one or more embodiments, the nut 414 may be overmolded to the U-shaped bracket 113.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 10 vehicle cabin
12 dashboard
13 vehicle floor
14 driver seat
16 passenger seat
50 prior art rail assembly
52 prior art rail assemblies
54 rail
56 spindle bracket
58 spindle
60 rear nut
62 bushing
64 front nut
66 limit stop
66 U-shaped limit stop
100 first rail assembly
100 rail assembly
102 cushion pan
104 translatable rail
106 fixed rail
108 spindle
108 first spindle
108 first gearbox
110 spindle bracket
111 aperture
112 gearbox
113 U-shaped bracket
114 nut
114 second nut
115 portion
116 first portion
118 second portion
120 third portion
122 first distal end
124 first counterbore
126 crush ribs
128 notch
130 spacer
132 second distal end
134 mating wall
135 lead-in chamfer
136 flange
138 protrusions
140 through opening
141 internal threads
142 sidewall
144 second counterbore
146 axis
214 nut
314 exemplary nut
314 nut
316 first portion
318 second portion
322 first distal end
324 fingers
326 retention tab
330 sidewall
332 second distal end
334 ribs
410 spindle bracket
412 gearbox assembly
414 nut
416 first portion
418 second portion
422 sidewall
424 projections
426 flange
100' second rail assemblies
100' second rail assembly
108a front portion
108b rear portion
108' second spindle
112' gearboxes
114a first nut
114' second nut
116' third portion
118' fourth portion

What is claimed is:

1. A rail assembly for use in a vehicle and configured to translate a cushion pan in a longitudinal direction, the rail assembly comprising:
a translatable rail;
a fixed rail;
a spindle configured to be coupled to a portion of the translatable rail or the fixed rail;
a gearbox assembly disposed on the spindle and configured to translate the translatable rail along the longitudinal direction and the fixed rail;
a spindle bracket defining a first aperture and fixed to either the translatable rail or the fixed rail; and
a nut disposed on the spindle and including a first portion, a second portion, and a third portion, wherein the first, second, and third portions are integrally formed with each other, wherein the first portion is at least partially disposed within the first aperture such that the spindle is radially movable with respect to the longitudinal direction, and a first distal end, formed by the third portion, is configured to stop the translatable rail at a predetermined position.

2. The rail assembly of claim 1, wherein the third portion is an elongated cylinder.

3. The rail assembly of claim 2, wherein the third portion includes a second aperture configured to receive the spindle and wherein the second aperture is a first counterbore extending from the first distal end to the second portion.

4. The rail assembly of claim 3, wherein the second portion includes a second counterbore, wherein an angle of the second counterbore and an angle of the first counterbore are same.

5. The rail assembly of claim 1, wherein the first portion includes a plurality of crush ribs radially extending from and forming a portion of an outer periphery of the first portion.

6. The rail assembly of claim 1, wherein the first portion is formed of a first material having a first elasticity and the second portion is formed of a second material having a second elasticity, wherein the first elasticity is greater elasticity than the second elasticity.

7. The rail assembly of claim 1, wherein the first portion includes a second distal end, wherein the second distal end includes a lead-in chamfer.

8. The rail assembly of claim 1, wherein the first portion includes a flange radially extending from an outer periphery of the first portion, wherein the flange is disposed on a first side of the spindle bracket and the gearbox assembly is disposed on a second side of the spindle bracket, opposite the first side of the spindle bracket.

9. The rail assembly of claim 8, wherein the second portion includes a sidewall radially extending from an outer periphery of the second portion, wherein the flange and the sidewall are configured to sandwich the spindle bracket.

10. A rail assembly for use in a vehicle and configured to translate a cushion pan in a longitudinal direction, the rail assembly comprising:
a translatable rail;
a fixed rail;
a spindle configured to be coupled to a portion of the translatable rail or the fixed rail;
a gearbox assembly including a gearbox and a gearbox bracket each disposed on the spindle and configured to carry the translatable rail along the longitudinal direction and the fixed rail; and
a nut fixed to the gearbox assembly and including a first portion and a second portion integrally formed with each other, wherein a section of the first portion is configured to engage the portion of the translatable rail or the fixed rail and the second portion includes a sidewall connected to the gearbox bracket.

11. The rail assembly of claim 10, wherein the second portion includes a first projection wherein the first projection at least partially extends through a vertical wall of the gearbox bracket.

12. The rail assembly of claim 11, wherein the second portion includes flange extending from the sidewall, wherein the gearbox bracket includes a horizontal wall orthogonally extending from the vertical wall of the gearbox assembly, and wherein the flange is fixed to the horizontal wall.

13. The rail assembly of claim 10, wherein the nut is at least partially overmolded to the gearbox assembly.

14. A vehicle seat assembly comprising:
a cushion pan;
a first track assembly coupled the cushion pan and including,
a first translatable rail,
a first fixed rail,
a first spindle configured to be coupled to a portion of the first translatable rail or the first fixed rail,
a first spindle bracket defining a first aperture and fixed to either the first translatable rail or the first fixed rail,
a first gearbox coupled to the first translatable rail and configured to translate along the spindle to translate the first translatable rail in a longitudinal direction, and
a first nut disposed on the first spindle and including a first portion and a second portion integrally formed with one another, wherein an outer periphery of the first portion is insertable within the first aperture; and
a second track assembly coupled the cushion pan and including,
a second translatable rail,
a second fixed rail,
a second spindle configured to be coupled to a portion of the second translatable rail or the second fixed rail,
a second spindle bracket defining a second aperture and fixed to either the second translatable rail or the second fixed rail, and
a second nut disposed on the second spindle and including a third portion portion and a fourth portion integrally formed with one another, wherein an outer periphery of the third portion is insertable within the second aperture, and wherein the second portion and the fourth portion are each configured to stop the first and second translatable rails at a predetermined position.

15. The vehicle seat assembly of claim 14, wherein the first nut has a first length and the second nut has a second length, different than the first length.

16. The vehicle seat assembly of claim 15, wherein the second length is greater than the first length.

17. The vehicle seat assembly of claim 16, wherein the first spindle includes a front portion and a rear portion, each disposed on opposite sides of the first gearbox, wherein the first track assembly includes a spacer, having a third length, disposed on the rear portion of the first spindle, wherein a difference between the first length and the second length corresponds to the third length of the spacer.

18. The vehicle seat assembly of claim 14, wherein the first nut includes a first plurality of internal threads and the second nut includes a second plurality of internal threads, wherein the first plurality of internal threads is arranged in a first direction and the second plurality of internal threads are arranged in a second direction, wherein the first direction is opposite the second direction.

19. The rail assembly of claim 10, wherein the portion of the fixed rail is formed by a spindle bracket.

20. The rail assembly of claim 19, wherein the spindle bracket is integrally formed to the fixed rail.

* * * * *